US005604804A

United States Patent [19]
Micali

[11] Patent Number: 5,604,804
[45] Date of Patent: Feb. 18, 1997

[54] METHOD FOR CERTIFYING PUBLIC KEYS IN A DIGITAL SIGNATURE SCHEME

[76] Inventor: Silvio Micali, 459 Chestnut Hill Ave., Brookline, Mass. 02146

[21] Appl. No.: 636,854

[22] Filed: Apr. 23, 1996

[51] Int. Cl.[6] .................................. H04L 9/00; H04L 9/30
[52] U.S. Cl. .............................. 380/25; 380/21; 380/23; 380/29; 380/30; 380/49
[58] Field of Search ................................. 380/9, 21, 23, 380/25, 29, 30, 49, 50

[56] References Cited

U.S. PATENT DOCUMENTS

| | | | |
|---|---|---|---|
| 4,326,098 | 4/1982 | Bouricius et al. | 380/25 |
| 4,888,801 | 12/1989 | Foster et al. | 380/21 |
| 4,926,480 | 5/1990 | Chaum | 380/23 |
| 5,097,504 | 3/1992 | Camion et al. | 380/23 |
| 5,214,702 | 5/1993 | Fischer | 380/30 |
| 5,261,002 | 11/1993 | Perlman et al. | 380/30 |
| 5,299,263 | 3/1994 | Beller et al. | 380/30 |
| 5,307,411 | 4/1994 | Anvret et al. | 380/25 |
| 5,420,927 | 5/1995 | Micali | 380/23 |

OTHER PUBLICATIONS

International Standard ISO/IEC 9594-8, "Information technology—Open Systems Interconnection—The Directory: Authentication framework", second edition, Sep. 15, 1995, *ISO/IEC*.

Micali, S., M.I.T. Technical Memo "A Secure and Efficient Digital Signature Algorithm" MIT/LCS/TM-501 *MIT Laboratory for Computer Science* 1–12 (Mar. 1994).

Rivest, R. L. et al., "A Method for Obtained Digital Signatures and Public–Key Cryptosystems" *Communications of the ACM* vol. 21, No. 2, 120–126 (Feb. 1978).

Shamir, Adi "Identity–Based Cryptosystems and Signature Schemes" *Dept. of Applied Mathematics, The Weizmann Institute of Science* 47–53 (undated).

Gennaro, R. et al. "Robust Threshold DSS Signatures" *EuroCrypt 96* (9 pages).

Harn, L. "Group–oriented (t,n) threshold digital signature scheme and digital multisignature" *IEE Proc.–Comput. Digit. Tech.* vol. 141, No. 5, 307–313 (Sep. 1994).

"Public Key Infrastructure Study—Final Report" *National Institute of Standards and Technology* (Apr. 1994).

Kent, S. et al., IAB Privacy Task Force, Request for Comments No. 1114, "Privacy Enhancement for Internet Electronic Mail: Part II—Certificate–Based Key Management" 1–22 (Aug. 1989).

*Primary Examiner*—Bernarr E. Gregory
*Attorney, Agent, or Firm*—Foley, Hoag & Eliot LLP

[57] ABSTRACT

A method for certifying public keys of a digital signature scheme in a communications system is provided. The secure communications system is one in which there are at least two levels of authorities. A user presents a piece of data to an intermediate level authority who, upon verifying the data, causes an issuing authority to issue a certificate that the piece of data posses a given property. Although the certificate is compacted by not having it contain a pubic key of the intermediate authority, nonetheless, information is stored in order to keep the intermediate authority accountable.

46 Claims, No Drawings

METHOD FOR CERTIFYING PUBLIC KEYS IN A DIGITAL SIGNATURE SCHEME

TECHNICAL FIELD

The present invention relates generally to secure communications and more particularly to a method for certifying public keys in a digital signature scheme to facilitate widespread verification of users' digital signatures.

BACKGROUND OF THE INVENTION

In any digital signature scheme, each user has a pair of matching verification and signing keys. A user U produces his digital signature of a message M by running a special algorithm on inputs that include M and his signing key. Of course, it is important that the signing key be kept secret by the user. User U's digital signature of a message M can be verified by running an algorithm whose inputs include the digital signature and U's verification key. The user's verification key must be as "public" as possible to allow as universal as possible verification of U's digital signatures. For these reasons, U's verification key is also referred to as U's public key, and the corresponding signing key as U's secret key.

The question of how a user can make his own public key truly public is an important problem. One solution, namely, having each user post his own verification key in a widely accessible file (e.g., a conventional or electronic data base), is not a satisfactory solution for two reasons. First, it may be inconvenient to retrieve U's public key from such a list when a verifier is presented with U's digital signature of a given message. Second, because a malicious user W may compute a pair of matching verification and signing keys (V and S) and post V as U's verification key, the malicious user may be able to digitally-sign messages that will be believed to be coming from U. It is thus important that whenever a given user wishes to post or otherwise publicize a key V as his verification key, there must be a way to correctly determine that the user in fact elects V as his verification key. This is the requirement that each public key in a digital signature scheme be properly "certified."

Techniques for building certificates of public keys are known in the art. The traditional way envisions a hierarchy of authorities. For example, assume that there is a simple two-level hierarchy: a few thousand first-level authorities, $A'_1, A'_2, \ldots$, and a single second-level authority, $A''$. It is assumed that each of the first-level authorities is capable of digitally signing, that their public keys, $PK'_1, PK'_2, \ldots$ are already known to $A''$, and that the public-key of $A''$, $PK''$, is universally known. When a user U wishes to have his chosen public key, $PK_U$, certified, he goes to the authority, $A'_c$, closest to (or most convenient for) him. After verifying U's identity and the fact that he wishes to elect $PK_U$ as his own signing key (alternatively $A'_c$ may receive a traditional notarized document to this effect), $A'_c$ provides U with a certificate consisting of (1) his own digital signature of $PK_U$ (relative to $PK'_c$) (2) his own public key $PK'_c$ and (3) the digital signature of $A''$ of $PK'_c$ (relative to $PK''$.) The second and third pieces of data are necessary since there may be a sufficiently-high number of first-level authorities and their public keys may not be universally known. Such a certificate is either given to user U, so that he will send it along with any digital signature of his (in order to enable anyone to verify it), or the certificate is posted in a sufficiently accessible database (so that anyone who wishes verify U's digital signature of a given message can retrieve the certificate of U's public key from the database).

In either case, a traditional certificate for $PK_U$ is quite long because it includes at least two pieces of data in addition to the signature of $PK_U$, namely, the digital signature of $A'$ and the public key of $A'$. This is undesirable, since public-key certificates must be sent along or retrieved with almost every single digital signature. Moreover, the recipient of a digital signature may wish to store its associated public-key certificate for a long time period to maintain proof of the signer's commitment. Such long certificates are thus very costly, because sending bits across communication lines (e.g., via a long-distance phone call) is expensive and because storing bits is expensive. Obviously the longer the certificate, the higher the cost associated with transmission and storage thereof.

In addition, decreasing the size of certificates should not be done at the expense of relieving intermediate authorities of accountability for the certificates which they cause to be certified. That is, if a user presents an intermediate authority with a piece of data to be certified, such as a public key, and the intermediate authority individually certifies the data and passes this certification on to a higher authority who issues the certificate, the intermediate authority should not be able to latter deny having contributed to the certification of the piece of data. However, when the certification of the intermediate authority is not included in the certificate issued by the higher authority, then such deniability exists absent some other mechanism for keeping the intermediate authority accountable even though the issued certificate does not contain a certification of the intermediate authority. In addition, this problem is compounded when there are many intermediate authorities whose certification will not be included in the issued certificate in the interest of decreasing the size of the issued certificate.

It is also known that n people may share a group verification key while each possesses his own piece of a secret key relative to the group verification key. A group digital signature of a message can be generated relative to the group verification key if t out of n of such people act upon a given message via their pieces of the secret key. At the same time, no less than t people in the group can produce a valid signature relative to the group verification key. Conceivably, data could be certified relative to such group keys. However, the individual signers in these groups are arguably on equal footing without the hierarchical structure of a conventional certification system.

There is thus a need to provide a new and efficient method of certifying public keys that produces very short and thus very inexpensive certificates and that further ensures that the authorities that contributed to the certification are kept accountable.

SUMMARY OF THE INVENTION

According to the present invention, certifying pieces of data in a system with at least two levels of authorities includes presenting a piece of data requiring certification to a first level authority for inspection of a given property, if the piece of data passes the inspection of the first level authority causing a higher authority to receive an indication that the piece of data has passed the inspection of at least the first level authority, having the higher authority issue a certificate that the piece of data possesses the given property where the certificate includes a signature of the higher authority but does not include a public key of the first level authority, and storing information in order to keep at least the first level authority accountable for pieces of data that the first level authority contributes to certify.

The signature of the higher authority is not a group digital signature of a public key shared with any first level authorities. Rather, it is a ordinary signature relative to the public key of the higher authority. Note, however, that it is possible to have two or more higher level authorities that contribute to issuance of the certificate by each providing his own digital signature relative to his own public key. It is thus for simplicity only that invention is illustrated herein using a single higher level authority.

The piece of data that is presented may be a public key having at least one corresponding secret key. A user may choose the public key to be used in connection with either a digital signature system or a public key encryption system. The inspection by the first level authority may include identifying the presenting user and also may include verifying that the user knows the secret key that corresponds to the public key. In the case of a digital signature system, the inspection may include checking a digital signature of a given message signed by the user relative to the public key to determine that the user knows the secret key associated with the public key. In the case of a public key encryption system, the inspection may include verifying that the user knows the secret key associated with the public key by having the user decrypt a given message that is encrypted using the public key.

In certain embodiments, the certified public verification key of the higher authority is sufficient to verify the certificate. The piece of data being certified may be included in the certificate. The higher authority may contribute additional data that is included in the certificate.

The information that is stored may be used to identify the first level authority and may include a digital signature of the first level authority or may indicate the name of the first level authority. A portion of the information that is stored may be stored in the certificate. All of the information that is stored may be stored in the certificate.

In certain embodiments, the higher level authority may cause additional information to be saved which, when combined with the information that is stored, proves that the first level authority contributed to certification of the piece of data. A witness may cause information to be saved that indicates that the first level authority contributed to certification of the piece of data in which case the information that is stored may be stored in a way to indicate the identity of the witness. The information that is caused to be saved by the witness may include a portion of a digital signature and the information that is stored may include an other portion of a digital signature. In certain embodiments, the portions of the digital signature can be combined to prove that the first level authority contributed to certification of the piece of data.

According further to the present invention, public keys are certified in a system where there are a plurality of authorities $A_1, \ldots, A_n$, where each i<n authority $A_i$ can send authority $A_{i+1}$ authenticated messages so that at least $A_{i+1}$ can be sure that these messages genuinely come from $A_i$, and authority $A_n$ has a signing key $SK_n$ and an associated certified public key, $PK_n$. The certification includes having a verification key $PK_U$ presented to authority $A_1$, having authority $A_1$ verify, by means of a predetermined procedure, that $PK_U$ possesses some properties out of a set of given properties, for all i<n, having authority $A_i$ send authority $A_{i+1}$ a message indicating that $PK_U$ has been verified to possess the given properties, having $A_n$ issue a certificate for $PK_U$ that includes a signature provided using $SK_n$ but does not include a public key of at least one authority $A_j$ for some j<n, and storing information to keep $A_j$ accountable for keys that $A_j$ contributes to certify. The certificate may not include a public key of at least one other authority, $A_k$, public keys of any authorities $A_1, A_2 \ldots A_{n-2}, A_{n-1}$, and/or a public key for $A_n$. In other embodiments, the certificate may include only a public key for $A_n$.

In certain embodiments, knowledge of $PK_n$ is sufficient to verify the certificate. $PK_U$ may be included in the certificate. At least one authority, $A_i$ i<n, may contribute additional data that is included in the certificate. Also, all authorities may contribute additional data that is included in the certificate. A digital signature of $A_j$ may be included in the certificate. Also, digital signatures of all of the authorities may be included in the certificate.

In certain embodiments, for all i<n, authority $A_i$ sends authority $A_{i+1}$ a digital signature of $A_i$. Also, it is possible that for all i<n, authority $A_i$ sends authority $A_{i+1}$ a digital signature of $A_i$ along with digital signatures of all previous authorities $A_{i+1}, A_{1-2} \ldots A_1$. Digital signatures of all of the authorities may be included in the certificate.

In certain embodiments, the information that is stored can be used to identify $A_j$. The information that is stored may be a digital signature of $A_j$ and/or may indicate the name of $A_j$. At least a portion of the information that is stored may be stored in the certificate. All of the information that is stored may be stored in the certificate.

An authority $A_k$ may cause additional information to be saved which, when combined with the information that is stored, proves that $A_j$ contributed to the certification of $PK_U$. In certain embodiments, k may be less than j. A witness may cause information to be saved that indicates that $A_j$ contributed to the certification of $PK_U$ where the information that is stored indicates the identity of the witness. The information that is caused to be saved by the witness may include a portion of a digital signature and the information that is stored may include an other portion of a digital signature. The portions of the digital signature may be combined to prove that $A_j$ contributed to the certificate being issued.

DETAILED DESCRIPTION OF PREFERRED EMBODIMENTS

Although the following discussion is in the context of certifying public keys of a digital signature scheme, it should be appreciated that the inventive technique is useful for certifying arbitrary data. Moreover, there is no requirement that the invention be implemented with any particular digital signature scheme and thus the following teachings should be considered merely exemplary and not limiting.

Assume that the authorities use a known or future digital signature scheme producing k-bit signatures, that each first-level authority $A'_i$ has independently chosen his own public key $PK'_i$, and that A" has his own totally unrelated public key PK". Then, when U goes to $A'_c$ with his key $PK_U$, $A'_c$ sends electronically to A" both $PK_U$ and his own signature of it. This signature signifies to A" that $A'_c$ has verified U's identity and U's desire to have $PK_U$ as his public key. In response to this message, A" might store the signature of $A'_c$ (in order to keep $A'_c$ accountable for the keys that $A'_c$ causes to be certified), and himself signs $PK_U$ relative to PK". This latter signature is a valid certificate for $PK_U$ (because the public key of A" is either universally known or is itself certified somewhere and thus anyone can check whether a digital signature of A" is correct), and is sent by A" to A'$_c$ (so that A'$_c$ can give it to U) or to U directly; or the signature is inserted in some accessible file or it is otherwise publicized.

Pieces of data (such as public keys) can be certified in a communications system with at least two levels of authorities. The method begins with the presentation of a piece of data requiring certification to a first-level authority for inspection of a given property. If the piece of data passes the inspection of the first-level authority, the first-level authority sends to a second-level (i.e., a higher) authority a digital signature evidencing that the piece of data has passed the inspection of the first-level authority. If the digital signature of the first-level authority is then shown to be correct, the second-level authority issues a digital signature that the piece of data possesses the given property.

Each certificate may consist of a single signature, that of A". To generate this simple certificate, A'$_c$ must send one additional k-message (his own signature of $PK_U$), and this transmitted message might be stored (e.g., by A") to keep A'$_c$ accountable. Such transmission and storage costs, however, are incurred only once per user (when the user makes his own public key) and not every time a signature is transmitted in a manner that allows verification that the public key belongs to the user. Traditionally, an issued public key is used to sign more than one message. Thus, k bits should be transmitted and stored per public key for certification purposes; however, if the certified public key is sent 100 times, for signature verification purposes relative to the public key, then at least 100k bits of transmission and storage are eliminated. Of course, this elimination provides significant economic benefits since there is a finite cost associated with the transmission and storage of data. There is an additional savings in computation since a recipient verifying a certificate needs only to verify the signature of A" rather than having to verify the signature of A" along with the signature of A'.

However, it is often desirable to keep one or more intermediate authorities accountable for the keys that they cause to be certified since the issued compact certificate does not contain individual certificates for all of the intermediate authorities. Accountability of the intermediate authorities can be achieved in a number of ways. Note that in the discussion that follows, reference to intermediate authorities (plural) is understood to include the case where there is only a single intermediate authority.

In the certificate compaction scheme described herein, one or more intermediate authorities cause an issuing authority (i.e., a higher or highest authority) to receive an indication that a piece of data has passed inspection of the intermediate authorities and posses a particular property (such as being a public key of a user used in connection with either a digital signature system or a public key encryption system). The indication from the intermediate authorities can be in the form of a digital signature and a corresponding public key. The issuing higher or highest authority then issues a certificate that the piece of data possesses the given property. The certificate includes a signature of the issuing authority but, in the interest of compaction, does not include a public key of one or more of the intermediate authorities.

The certified public verification key of the issuing authority is often sufficient to verify the compact certificate. Note that the public verification key of the issuing authority can be understood to be certified either because it is already known to direct or indirect recipients of the certificate or because the certificate includes a certification of the verification key.

Accountability of the intermediate authorities can be established by storing information that keeps the intermediate authorities accountable for pieces of data that they contribute to certify. That information can then be accessed if it becomes necessary (i.e., if one or more of the intermediate authorities deny having contributed to the certification of the data). The information that is stored can be identification information such as a digital signature of the intermediate authorities or the name of the intermediate authorities. Any portion of the information, including all of the information, can be stored in the certificate. Alternatively, a portion or all of the information for keeping the intermediate authorities accountable can be stored in memory by the issuing authority.

The piece of data being certified may be included in the certificate. The issuing authority can contribute additional data, such as a time or date stamp, that is also included in the certificate. The issuing authority may cause additional information to be saved which, when combined with the information that is stored, proves that the intermediate authorities contributed to certification of the piece of data. The additional information saved by the issuing authority could be a portion of a digital signature which, when combined with another portion of the digital signature included with the information stored in order to keep the intermediate authorities accountable, proves that the intermediate authorities contributed to certification of the data.

A witness, such as an unrelated third party or another authority that is not a direct party in the chain of the certification, may cause information to be saved that indicates that the intermediate authorities contributed to certification of the piece of data. In that case, the information that is stored may be stored in a way to indicate the identity of the witness. The information that is caused to be saved by the witness can include a portion of a digital signature and the information that is stored can include an other portion of a digital signature. The portions of the digital signature can be combined to prove that the intermediate authorities contributed to certification of the piece of data.

A digital signature of at least one of the intermediate authorities may be included in the certificate. Also, digital signatures of all of the intermediate authorities may be included in the certificate along with a digital signature of the issuing authority. Each intermediate authority can pass it's signature to the next highest authority. In addition, each intermediate authority can pass the signatures of all previous authorities to the next highest authority.

It should also be recognized that the highest authority may be the only authority that is capable of digitally signing. In such variation, the lower level authorities may just send to the highest authority an otherwise different type of certification indicating that the user wishes to have a key recognized as his public key. The remainder of the technique would proceed as described above.

It is also desirable that a user presenting a given verification key for certification be able to show that he has legitimately chosen the key. In particular, before an authority agrees to certify (or to participate in the certification of) the verification key $PK_U$ presented by a user U, it may be important to inspect that U knows the secret signing key corresponding to $PK_U$. This feature is missing in traditional certificates, and its absence creates a great deal of problems or confusion. This problem is solved by ensuring that during the certification of a public key (whether or not there is a hierarchy of authorities), some authority inspects that the user presenting a given verification key for certification has legitimately chosen it.

One way to accomplish this is to have this authority verify that the presenting user knows the corresponding secret signing key. This can be done by asking the user to sign a given message. While the given message might always be the same one, such a technique is not the preferred method because a malicious v may get hold of U's signature of this message from the time when U certifies his own $PK_U$. (Indeed V may be the inspecting authority himself). A better approach would be for the user presenting a verification key $PK_U$ to be asked to sign a message randomly selected by the authority. This approach, while better than the fixed message approach, may enable the authority to trick the user into signing something against his own will.

A still better alternative would be to have the authority choose a message $M_A$ and the user choose a message $M_U$. The user then could sign $H(M_A!M_U)$, where ! is a concatenation operator and H is a secure function, such as a secure hash function. If the identification of the user and the witnessing of his selection for the public key occurs in a person-to-person meeting between the user and authority, the user would be obliged to carry a suitable signing device, which under some circumstances may be impractical.

Therefore, it is desirable to have the user U sign, relative to his presented verification key $PK_U$, a predetermined message such as the message "U is the owner of $PK_U$". If desired possibly, additional pieces of information, such as the date, can be included in the predetermined message. The authority may in fact identify that the presenting user is indeed U. This preferred method presents the advantage that the signed message, while not always the same for all users, is of a standard form, and can thus be signed off-line by the presenting user. Indeed, the user need not bring a signing device even if a direct meeting with the authority is required; rather it suffices that he exhibits somehow (even remotely) the required signature in a computer diskette, or memory card, or printed on a piece of paper. Alternatively, the user may memorize it, or exhibit it by means of any other convenient medium. Moreover, the method is secure, since a malicious V cannot have utilized the message "U is the owner of public key $PK_U$" signed by U when he had his own key certified; in fact, V will not succeed in identifying himself as U. Also, the authority cannot possibly trick a presenting user to sign something against his will.

It should also be noted that the signature schemes used by the users (to sign their messages) may be different from the signature schemes used by the authorities to sign their messages. In addition, as used herein if the key of an authority is universally known, then the key is considered to be "certified" and the certificate of the key may be empty.

It should be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the following claims.

What is claimed is:

1. A method for certifying pieces of data in a system having authorities that certify data, comprising the steps of:

(a) presenting a piece of data requiring certification to a first authority for inspection of a given property;

(b) if the piece of data passes the inspection of the first authority, causing a second authority to receive an indication that the piece of data has passed the inspection of at least the first authority;

(c) having the second authority issue a certificate that the piece of data possesses the given property, the second authority including in the certificate a signature of the second authority and the second authority omitting from the certificate a public key of the first authority; and (d) storing accountability information that renders at least the first authority accountable for pieces of data that the first authority contributes to certify.

2. A method for certifying, according to claim 1, wherein the piece of data presented is a public key having at least one corresponding secret key associated therewith.

3. A method for certifying, according to claim 2, wherein the given property of the public key includes a given user choosing the public key to be used in connection with at least one of: a digital signature system and a public key encryption system.

4. A method for certifying, according to claim 3, wherein the inspection by the first authority includes identifying the presenting user.

5. A method for certifying, according to claim 4, wherein the inspection includes verifying that the user knows the secret key that corresponds to the public key.

6. A method for certifying, according to claim 5, wherein the inspection includes checking a digital signature of a given message signed by the user relative to said public key, to determine that the user knows the secret key associated with the public key.

7. A method for certifying, according to claim 5, wherein the inspection includes verifying that the user knows the secret key associated with the public key by having the user decrypt a given message that is encrypted using the public key.

8. A method for certifying, according to claim 1, wherein a certified public verification key of the second authority is sufficient to verify the certificate.

9. A method for certifying, according to claim 1, wherein the piece of data is included in the certificate.

10. A method for certifying, according to claim 9, wherein the second authority contributes additional data that is included in the certificate.

11. A method for certifying, according to claim 1, wherein the accountability information identifies the first authority.

12. A method for certifying, according to claim 1, wherein the accountability information is a digital signature of the first authority.

13. A method for certifying, according to claim 12, wherein the certificate includes a digital signature of the first authority.

14. A method for certifying, according to claim 11, wherein the accountability information indicates the name of the first authority.

15. A method for certifying, according to claim 11, wherein the certificate includes a digital signature of the first authority.

16. A method for certifying, according to claim 1, wherein at least a portion of the accountability information is stored in the certificate.

17. A method for certifying, according to claim 16, wherein all of the accountability information is stored in the certificate.

18. A method for certifying, according to claim 1, wherein the certificate includes a digital signature of the first authority.

19. A method for certifying, according to claim 1, further comprising the step of:

(e) the second authority causing additional information to be saved which, when combined with the accountability information, proves that the first authority contributed to certification of the piece of data.

20. A method for certifying, according to claim 1, further comprising the step of:
   (e) a witness causing information to be saved that indicates that the first authority contributed to certification of the piece of data, wherein the information that is saved by the witness is separate from the accountability information and wherein the accountability information is stored in a way to indicate the identity of the witness.

21. A method for certifying, according to claim 20, wherein the information caused to be saved by the witness includes a portion of a digital signature and the accountability information includes an other portion of the digital signature.

22. A method for certifying, according to claim 21, wherein the portions of the digital signature, when combined, prove that the first authority contributed to certification of the piece of data.

23. A method for certifying public keys where there are a plurality of authorities $A_1, \ldots, A_n$ that certify data, where each $i<n$ authority $A_i$ is configured to send authority $A_{i+1}$ authenticated messages that are verifiable by $A_{i+1}$ as having genuinely come from $A_i$, and authority $A_n$ has a signing key $SK_n$ and an associated certified public key, $PK_n$, the method comprising the steps of:
   (a) having a verification key $PK_U$ presented to authority $A_1$;
   (b) having authority $A_1$ verify, by means of a predetermined procedure, that $PK_U$ possesses some properties out of a set of given properties;
   (c) for all $i<n$, having authority $A_i$ send authority $A_{i+1}$ a message indicating that $PK_U$ has been verified to possess the given properties;
   (d) having $A_n$ issue a certificate for $PK_U$, $A_n$ including in the certificate a signature provided using $SK_n$ and $A_n$ omitting from the certificate a public key of at least one authority $A_j$ for some $j<n$; and
   (e) storing accountability information that renders $A_j$ accountable for keys that $A_j$ contributes to certify.

24. A method for certifying, according to claim 23, wherein the certificate does not include a public key of at least one other authority $A_k$.

25. A method for certifying, according to claim 24, wherein the certificate does not include public keys of any authorities $A_1, A_2 \ldots A_{n-2}, A_{n-1}$.

26. A method for certifying, according to claim 25, wherein the certificate does not include a public key for $A_n$.

27. A method for certifying, according to claim 25, wherein the certificate includes a public key for $A_n$.

28. A method for certifying, according to claim 23, wherein knowledge of $PK_n$ is sufficient to verify the certificate.

29. A method for certifying, according to claim 23, wherein $PK_U$ is included in the certificate.

30. A method for certifying, according to claim 29, wherein at least one authority $A_i$, $i<n$, contributes additional data that is included in the certificate.

31. A method for certifying, according to claim 30, wherein all authorities contribute additional data that is included in the certificate.

32. A method for certifying, according to claim 23, wherein a digital signature of $A_j$ is included in the certificate.

33. A method for certifying, according to claim 32, wherein digital signatures of all of the authorities are included in the certificate.

34. A method for certifying, according to claim 23, wherein for all $i<n$, authority $A_i$ sends authority $A_{i+1}$ a digital signature of $A_i$.

35. A method for certifying, according to claim 34, wherein for all $i<n$, authority $A_i$ sends authority $A_{i+1}$ a digital signature of $A_i$ along with digital signatures of all previous authorities $A_{i-1}, A_{i-2} \ldots A_1$.

36. A method for certifying, according to claim 35, wherein digital signatures of all of the authorities are included in the certificate.

37. A method for certifying, according to claim 23, wherein the accountability information identifies $A_j$.

38. A method for certifying, according to claim 37, wherein the accountability information is a digital signature of $A_j$.

39. A method for certifying, according to claim 37, wherein the accountability information indicates the name of $A_j$.

40. A method for certifying, according to claim 23, wherein at least a portion of the accountability information is stored in the certificate.

41. A method for certifying, according to claim 40, wherein all of the accountability information is stored in the certificate.

42. A method for certifying, according to claim 23, further comprising the step of:
   (f) an authority $A_k$ causing additional information to be saved which, when combined with the accountability information, proves that $A_j$ contributed to the certification of $PK_U$.

43. A method for certifying, according to claim 42, wherein $k>j$.

44. A method for certifying, according to claim 23, further comprising the step of:
   (f) a witness causing information to be saved that indicates that $A_j$ contributed to the certification of $PK_U$, wherein the information that is saved is separate from the accountability information and the accountability information indicates the identity of the witness.

45. A method for certifying, according to claim 44, wherein the information that is caused to be saved by the witness includes a portion of a digital signature and the accountability information includes an other portion of the digital signature.

46. A method for certifying, according to claim 45, wherein the portions of the digital signature, when combined, prove that $A_j$ contributed to the certificate being issued.

* * * * *